US007242770B2

(12) United States Patent
Casterline et al.

(10) Patent No.: US 7,242,770 B2
(45) Date of Patent: Jul. 10, 2007

(54) SECURE ENCRYPTION/DECRYPTION FOR ELEVATORS

(75) Inventors: Tony L. Casterline, Bryan, OH (US); James W. Kruse, Harlan, IN (US)

(73) Assignee: C.E. Electronics, Inc., Bryan, OH (US)

(*) Notice: Subject to any disclaimer, the term of this patent is extended or adjusted under 35 U.S.C. 154(b) by 863 days.

(21) Appl. No.: 10/190,769

(22) Filed: Jul. 8, 2002

(65) Prior Publication Data
US 2004/0005062 A1    Jan. 8, 2004

(51) Int. Cl.
*H04L 9/18* (2006.01)

(52) U.S. Cl. .......................... 380/59; 380/56; 380/37; 380/43

(58) Field of Classification Search ................. 380/287; 187/247
See application file for complete search history.

(56) References Cited

U.S. PATENT DOCUMENTS

| | | | |
|---|---|---|---|
| 5,412,730 A | 5/1995 | Jones | |
| 5,757,913 A | 5/1998 | Bellare et al. | |
| 5,757,922 A * | 5/1998 | Shiroshita | 380/42 |
| 6,003,637 A * | 12/1999 | Kim et al. | 187/391 |
| 6,349,795 B1 * | 2/2002 | Tatsumi et al. | 187/247 |
| 6,359,986 B1 * | 3/2002 | Tatebayashi | 380/277 |
| 6,367,010 B1 | 4/2002 | Venkatram et al. | |
| 6,425,460 B2 * | 7/2002 | Schuster | 187/247 |
| 6,446,761 B1 * | 9/2002 | Motoyama et al. | 187/391 |
| 6,450,298 B1 * | 9/2002 | Koura et al. | 187/247 |
| 6,471,011 B1 * | 10/2002 | Ando et al. | 187/247 |
| 6,554,107 B2 * | 4/2003 | Yumura et al. | 187/247 |
| 6,598,710 B2 * | 7/2003 | Motoyama et al. | 187/391 |
| 6,672,429 B1 * | 1/2004 | Thurmond, III | 187/247 |
| 7,020,160 B1 * | 3/2006 | Achler | 370/466 |
| 2002/0163905 A1 * | 11/2002 | Brabrand | 370/347 |
| 2003/0034209 A1 * | 2/2003 | Tang et al. | 187/247 |

* cited by examiner

*Primary Examiner*—Ayaz Sheikh
*Assistant Examiner*—Saoussen Besrour
(74) *Attorney, Agent, or Firm*—Emch, Schaffer, Schaub & Porcello Co., L.P.A.

(57) ABSTRACT

This system relates to a secure encryption/decryption protocol for elevator displays and controls. The protocol uses an algorithm to scramble information before transmission and reassemble it after transmission. The system uses at least one block of data assembled into unencrypted N-bits of information. An encryption device encodes the data into at least one block of encrypted M-bits of information. A data encryption mask provides an encryption routine which also includes scrambling the data.

25 Claims, 6 Drawing Sheets

SECURE ENCRYPTION/DECRYPTION FOR ELEVATORS

TECHNICAL FIELD

This invention relates to secure encryption/decryption protocol for elevator displays and controls. The protocol uses an algorithm to scramble information before transmission and reassemble it after transmission.

BACKGROUND OF THE INVENTION

Data encryption provides security for transmitted data by scrambling the "clear text" data into "scrambled text". Typically, the transmitted data is scrambled in a manner selected by a unique key value. For example, this could be a 56-bit binary number. This then is unscrambled at the receiving station by a reverse process.

The present invention relates to a communication device for an elevator control system. The communication device performs data communication in a data communication network of the elevator control system.

More specifically, the communication protocol sends information to the elevators displays and controls. In the past, the format was extremely straightforward and easy to comprehend. Because of the straightforward manner in which the protocol was carried out, it was very insecure. A method and apparatus for generating secure elevator protocols was needed.

BRIEF SUMMARY OF THE INVENTION

The process and apparatus of this invention uses a secure communication in an elevator display and control systems. A primary controller provides information or controls the internal operations of at least one elevator. The system uses at least one block of data assembled into unencrypted N-bits of information, and an encryption device that encodes the data into at least one block of encrypted M-bits of information. A data encryption mask defines an encryption routine for placing the N-bits of information into M-bits of information using an algorithm. A transmitter transmits encrypted data from the primary controller of an elevator; and a decryption algorithm decodes the encrypted information into unencrypted information.

Within the old protocol, three basic packets were transmitted, a floor packet, a message packet, and a travel packet.

The floor packet could be broken down in to a floor header, a floor number, three ASCII characters describing the floor (i.e. LBY for Lobby), and some miscellaneous bits. The message packet would contain a message header, message number, three message characters, and some message bits. The travel packet would contain floor numbers, message numbers and single bits each representing a flag for a particular event like door strobes, chimes, up arrows, down arrows, and the like.

As mentioned above, these data packets were very insecure. It would be a simple matter for a person of skill to pick apart the data and discover how to use it. The ASCII information is especially easy to comprehend.

During the encryption, a data encryption mask is employed. The data encryption mask defines the encryption routine where all of the data bits should be placed. There are several data encryption masks. The decoding key bits make up a word that describes which mask was used during the encryption process.

In order to reassemble the information, an algorithm receives all three encrypted packets, determine which packet is which based upon the type nibble, resolves which encryption mask was employed when the data was scrambled, and then uses that same encryption mask to decipher the data and place it back into the floor, message and travel packets.

DETAILED DESCRIPTION OF THE INVENTION

In a preferred embodiment, the primary controller controls operations of a plurality of elevators and a plurality of subordinate controllers controls inputs to and outputs from the elevators. The system works well with a single elevator as well as multiple elevators.

Figure 1:
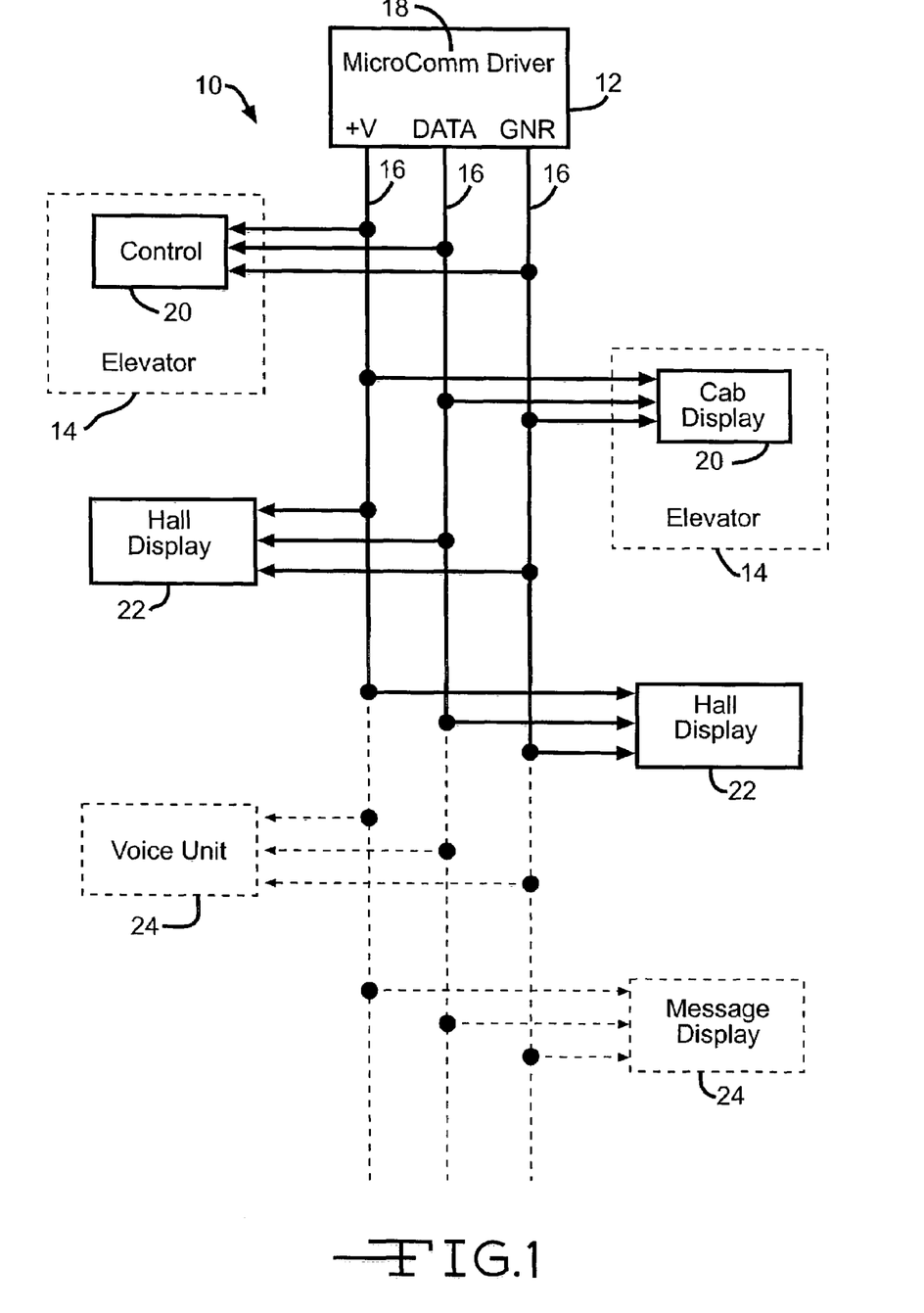
FIG. 1 is a block diagram for the elevator control system of this invention.

FIG. 1 is a block diagram for elevator control system 10 of this invention. System 10 includes controller 12 for controlling the internal operations of elevators 14. Controller 12 manages elevator operations and communicates with MICRO COMM® Driver 18. Driver 18 communicates through communication device 16 which is a network of common series transmission lines. Control 12 includes MICRO COMM® Driver 18. System 10 transmits information pertaining to floor, door position, and direction through MICRO COMM® link 18. MICRO COMM® is a registered trademark for elevator controls and floor indicators. Elevators 14 display information through elevator controls 20 which include displays which are visible in the cabs of the elevators. Hall displays 22 provide information in the lobbies and floors of buildings. Other displays 24 provide information where needed.

Figure 2:
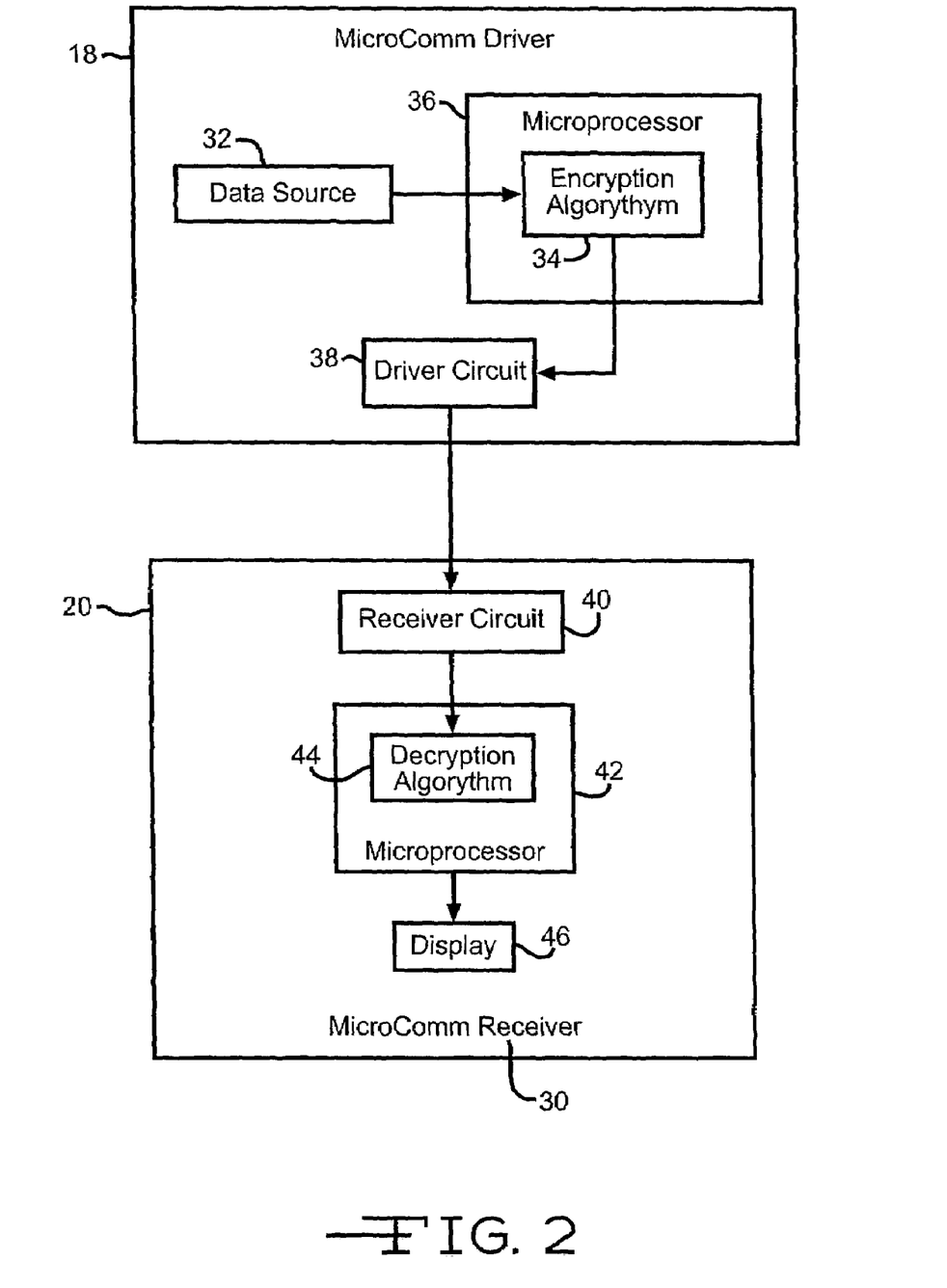
FIG. 2 is a block diagram for the primary and subordinate controllers of this invention.

FIG. 2 shows the components and operation of driver 18 and controls 20 which include MICRO COMM® receiver 30. Driver 18 includes data source 32 providing bits of information to encryption algorithm 34. Microprocessors 36 stores algorithm 34. Microprocessor 36 using algorithm 34 transmits encrypted information through driver circuit 38. Receiver 30 receives the encrypted information through receiver circuit 40. Circuit 40 transmits the encrypted information to microprocessor 42 through decryption algorithm 44. Algorithm 44 decodes the information and processor 42 sends the decrypted information to display 46. While control 20 is described in FIG. 2, displays 22 and 24 include similar controls.

Figure 3:
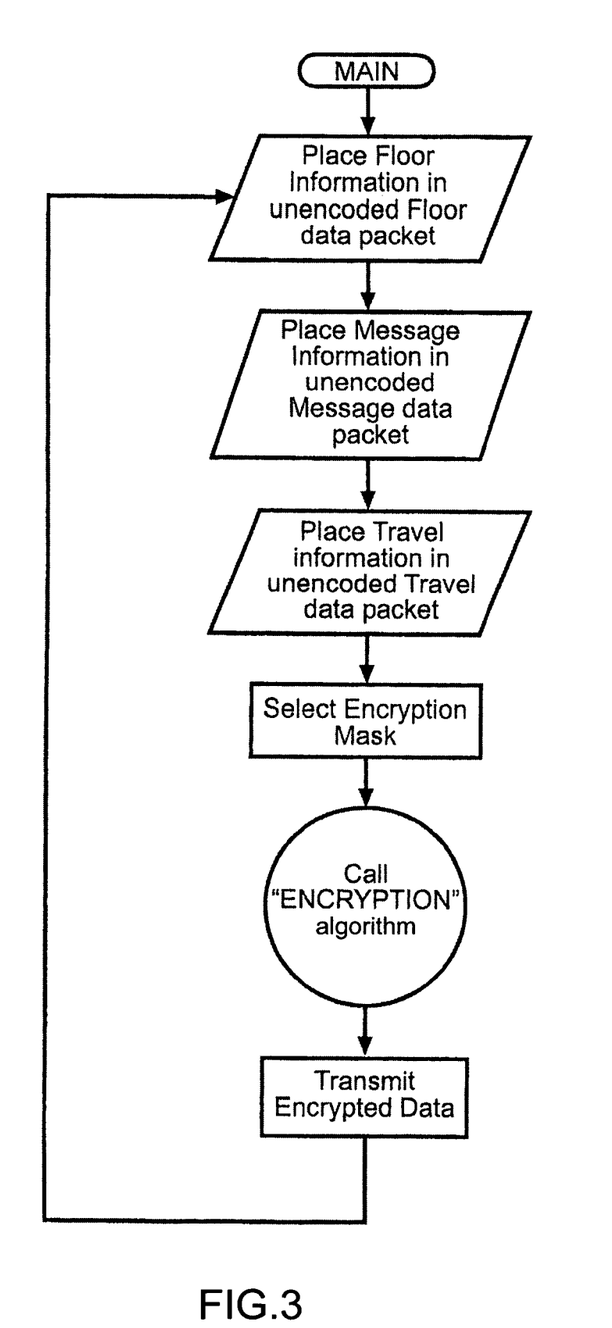
FIG. 3 is a flow chart showing the process steps for encryption according to the present invention.
Figure 4:
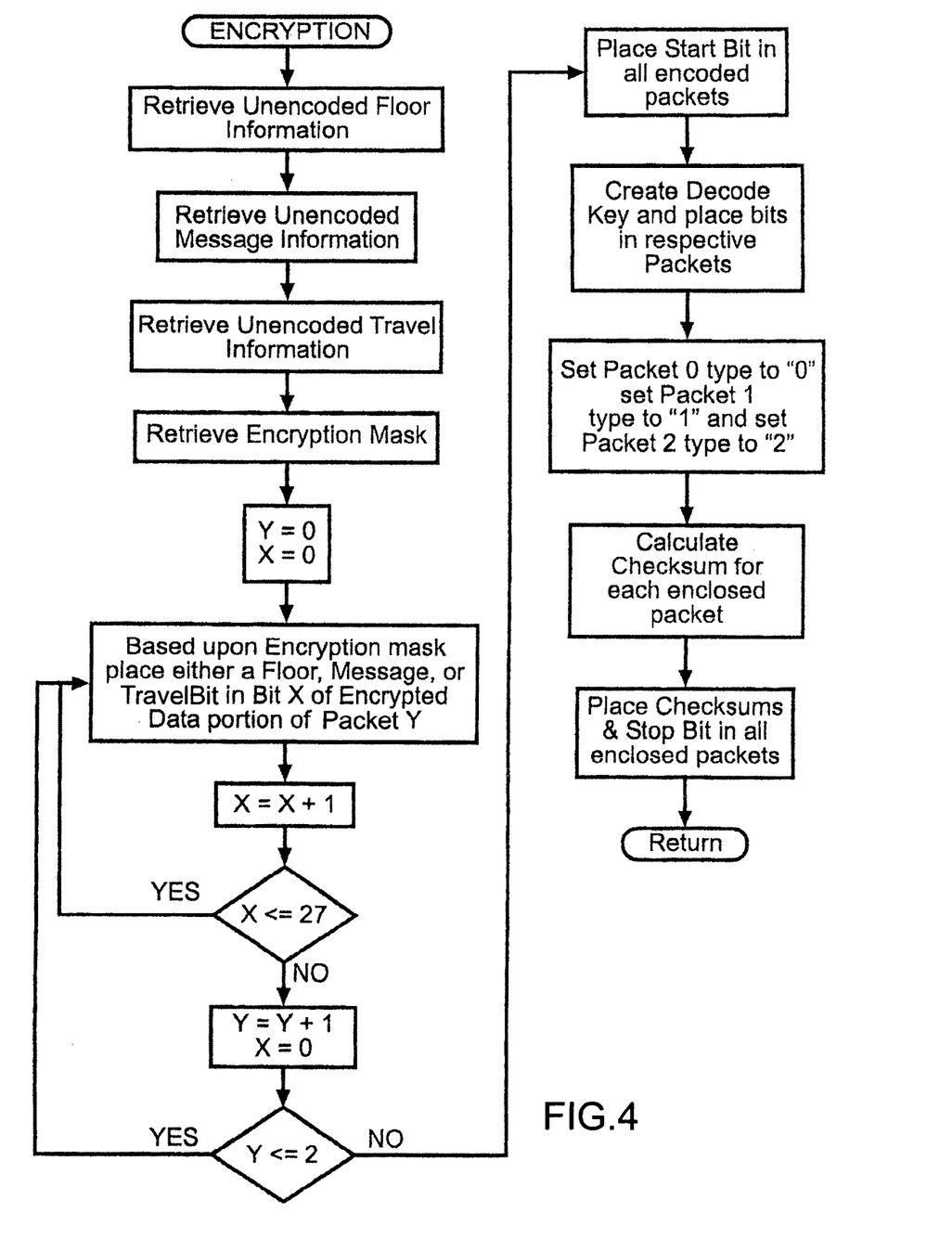
FIG. 4 is a flow chart showing the encryption in greater detail.
Figure 5:
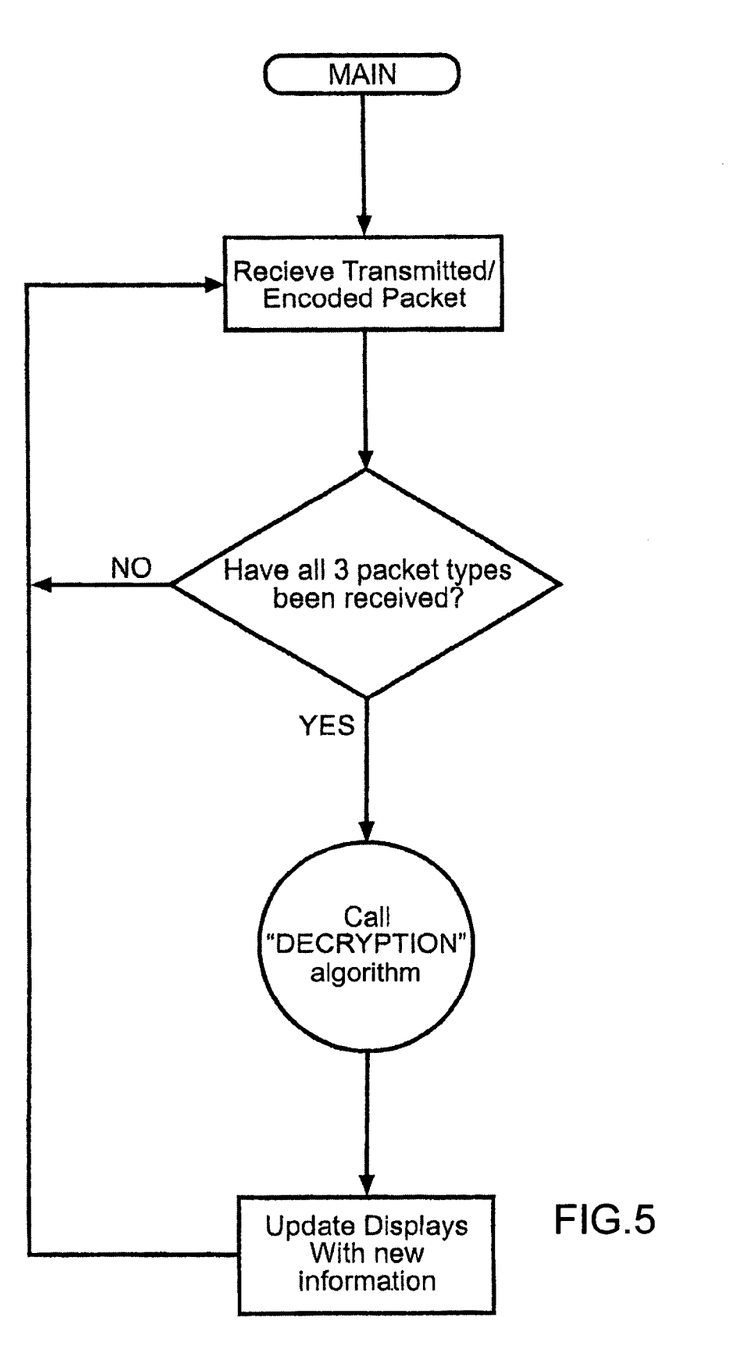
FIG. 5 is a flow chart showing the process steps for decryption according the present invention.
Figure 6:
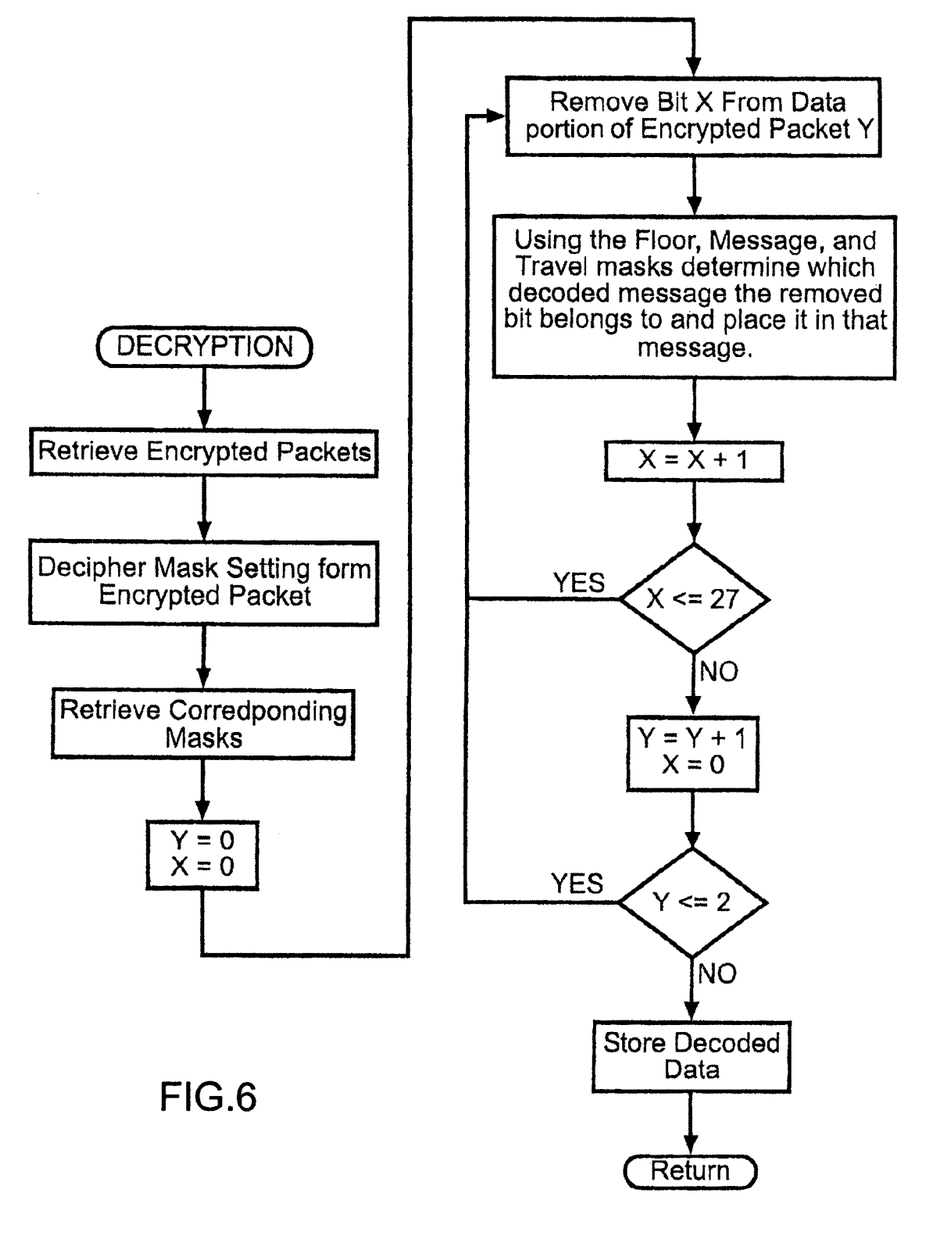
FIG. 6 is a flow chart showing the decryption in greater detail.

FIGS. 3-6 are the flow charts for encryption and decryption according to this invention. FIGS. 3 and 4 shows the steps needed for taking unencoded information, selecting an encryption mask, calling the encryption algorithm and transmitting encrypted data. FIGS. 5 and 6 shows the steps for receiving transmitted encoded packets, calling the decryption algorithm, decoding the encrypted packets and using the decoded messages.

Encoding Description:

Prior to encoding any of the information, the data is assembled into 28 bits of floor information, 28 bits of message information, and 28 bits of travel information. These packets are very similar to the old packets where the floor packet would consist of a floor number, floor ASCII, and some miscellaneous bits. The other two packets are similar as well.

Then, the data is encoded into three 40-bit packets. These encoded packets are comprised of a start bit, type nibble (4-bits), decoding key bit, encrypted data, decoding key bit, checksum, and a stop bit. The type bits and the decoding key bits are not encrypted.

During the encryption, a data encryption mask is employed. The data encryption mask defines to the encryption routine where all of the data bits should be placed. There are several data encryption masks. The decoding key bits make up a word that describes which mask was used during the encryption process.

Bits from the structured 28-bit floor packet are scattered across all three of the encoded messages inside the encrypted portion of the data. The organized message and travel packets are scattered across the encoded messages in a similar fashion.

When the encryption is complete, three 40-bit packets house all of the floor, message and travel information. However all of the data has been scrambled based upon the encryption mask.

Decoding Description:

In order to reassemble the information, an algorithm will need receive all three encrypted packets, determine which packet is which based upon the type nibble, resolve which encryption mask was employed when the data was scrambled, and then use that same encryption mask to decipher the data and place it back into the floor, message and travel packets.

Prior to encoding and after decoding the Floor Packet looks like this:

| Bit 27 | Floor Number (bit 7) | Bit 13 | Floor ASCII MidNibble (bit 5) |
|---|---|---|---|
| Bit 26 | Floor Number (bit 6) | Bit 12 | Floor ASCII MidNibble (bit 4) |
| Bit 25 | Floor Number (bit 5) | Bit 11 | Floor ASCII MidNibble (bit 3) |
| Bit 24 | Floor Number (bit 4) | Bit 10 | Floor ASCII MidNibble (bit 2) |
| Bit 23 | Floor Number (bit 3) | Bit 9 | Floor ASCII MidNibble (bit 1) |
| Bit 22 | Floor Number (bit 2) | Bit 8 | Floor ASCII MidNibble (bit 0) |
| Bit 21 | Floor Number (bit 1) | Bit 7 | Floor ASCII LSNibble (bit 5) |
| Bit 20 | Floor Number (bit 0) | Bit 6 | Floor ASCII LSNibble (bit 4) |
| Bit 19 | Floor ASCII MSNibble (bit 5) | Bit 5 | Floor ASCII LSNibble (bit 3) |
| Bit 18 | Floor ASCII MSNibble (bit 4) | Bit 4 | Floor ASCII LSNibble (bit 2) |
| Bit 17 | Floor ASCII MSNibble (bit 3) | Bit 3 | Floor ASCII LSNibble (bit 1) |
| Bit 16 | Floor ASCII MSNibble (bit 2) | Bit 2 | Floor ASCII LSNibble (bit 0) |
| Bit 15 | Floor ASCII MSNibble (bit 1) | Bit 1 | Spare Bit (SPARE 2 bit 3) |
| Bit 14 | Floor ASCII MSNibble (bit 0) | Bit 0 | Spare Bit (SPARE 2 bit 2) |

Prior to encoding and after decoding the Message Packet looks like this:

| Bit 27 | If this bit is set, the packet is not a message packet, and bits 26-0 are reserved for future expansion. | Bit 13 | Message ASCII MidNibble (bit 5) |
|---|---|---|---|
| Bit 26 | Message Number (bit 6) | Bit 12 | Message ASCII MidNibble (bit 4) |
| Bit 25 | Message Number (bit 5) | Bit 11 | Message ASCII MidNibble (bit 3) |
| Bit 24 | Message Number (bit 4) | Bit 10 | Message ASCII MidNibble (bit 2) |
| Bit 23 | Message Number (bit 3) | Bit 9 | Message ASCII MidNibble (bit 1) |
| Bit 22 | Message Number (bit 2) | Bit 8 | Message ASCII MidNibble (bit 0) |
| Bit 21 | Message Number (bit 1) | Bit 7 | Message ASCII LSNibble (bit 5) |
| Bit 20 | Message Number (bit 0) | Bit 6 | Message ASCII LSNibble (bit 4) |
| Bit 19 | Message ASCII MSNibble (bit 5) | Bit 5 | Messaage ASCII LSNibble (bit 3) |
| Bit 18 | Message ASCII MSNibble (bit 4) | Bit 4 | Message ASCII LSNibble (bit 2) |
| Bit 17 | Messzage ASCII MSNibble (bit 3) | Bit 3 | Message ASCII LSNibble (bit 1) |
| Bit 16 | Message ASCII MSNibble (bit 2) | Bit 2 | Message ASCII LSNibble (bit 0) |
| Bit 15 | Message ASCII MSNibble (bit 1) | Bit 1 | Spare Bit (SPARE 2 bit 1) |
| Bit 14 | Message ASCII MSNibble (bit 0) | Bit 0 | Spare Bit (SPARE 2 bit 0) |

Prior to encoding and after decoding the Travel Packet looks like this:

| Bit 27 | Arrival Arrow Up | Bit 13 | Fire Service |
|---|---|---|---|
| Bit 26 | Arrival Arrow Down | Bit 12 | Fire Alternate |
| Bit 25 | Rear Arrival Up | Bit 11 | Play Strobe |
| Bit 24 | Rear Arrival Down | Bit 10 | SPARE 1 (bit 7) |
| Bit 23 | Travel Arrow Up | Bit 9 | SPARE 1 (bit 6) |
| Bit 22 | Travel Arrow Down | Bit 8 | SPARE 1 (bit 5) |
| Bit 21 | Gong Up | Bit 7 | SPARE 1 (bit 4) |
| Bit 20 | Gong Down | Bit 6 | SPARE 1 (bit 3) |
| Bit 19 | Rear Gong Up | Bit 5 | SPARE 1 (bit 2) |
| Bit 18 | Rear Gong Down | Bit 4 | SPARE 1 (bit 1) |
| Bit 17 | Double Gong Down | Bit 3 | SPARE 1 (bit 0) |
| Bit 16 | Passing Chime | Bit 2 | SPARE 2 (bit 6) |
| Bit 15 | Fire Priority A | Bit 1 | SPARE 2 (bit 5) |
| Bit 14 | Fire Priority B | Bit 0 | SPARE 2 (bit 4) |

Three packets for transmission after Encryption:

| Packet # | Bit 1 | Bits 2–5 | Bit 6 | Bits 7–34 | Bit 35 | Bits 36–39 | Bit 40 |
| --- | --- | --- | --- | --- | --- | --- | --- |
| 1 | Start Bit | Type Nibble | Decode Key Bit 0 | Encoded Data | Decode Key Bit 3 | Checksum | Stop Bit |
| 2 | Start Bit | Type Nibble | Decode Key Bit 1 | Encoded Data | Decode Key Bit 4 | Checksum | Stop Bit |
| 3 | Start Bit | Type Nibble | Decode Key Bit 2 | Encoded Data | Decode Key Bit 5 | Checksum | Stop Bit |

In addition to these embodiments, persons skilled in the art can see that numerous modifications and changes may be made to the above invention without departing from the intended spirit and scope thereof.

We claim:

1. A secure communication system for an elevator information or control system comprising:
    a primary controller wherein the primary controller includes:
    at least one block of data assembled into unencrypted N-bits of information,
    an encryption routine including an encryption algorithm for encoding the data into at least one block of encrypted M-bits of information;
    a data encryption mask directing the encryption routine for placing the N-bits of information into M-bits of information; and
    a transmitter for transmitting encrypted data from the primary controller;
    wherein the at least one block of M-bits of information is three scattered packets of information, and
    wherein the at least one block of data assembled into unencrypted N-bits of information is three blocks of separate unencrypted information
    wherein the at least one block of N-bits of information is three basic packets of information and wherein the three basic packets of information are a floor packet, a message packet and a travel packet; and
    wherein the at least one block of M-bits of information comprises a start bit, type nibble, decoding key bit, encrypted data, decoding key bit, checksum, and a stop bit.

2. A system according to claim 1 including a receiver for receiving the encrypted data from the transmitter wherein the receiver includes:
    a decryption algorithm for decoding the encrypted information into unencrypted information.

3. A secure communication system for an elevator information or control system comprising:
    a primary controller for controlling operations of a plurality of elevators, displays, voice units, and communication lanes wherein the primary controller includes:
    at least one block of data assembled into unencrypted N-bits of information;
    an encryption routine including an encryption algorithm for encoding the data into at least one block of encrypted M-bits of information;
    a data encryption mask directing the encryption routine for placing the N-bits of information into M-bits of information;
    a transmitter for transmitting encrypted data from the primary controller;
    a plurality of subordinate controllers for controlling inputs to and outputs from an elevator wherein the subordinate controllers include;
    receivers for receiving the encrypted data from the transmitter wherein the receivers include:
    a decryption algorithm in the subordinate controllers for decoding the encrypted information into unencrypted information,
    wherein the at least one block of M-bits of information is three scattered packets of information,
    wherein the at least one block of data assembled into unencrypted n-bits of information is three blocks of separate unencrypted information; and
    wherein the at least one block of N-bits of information is three basic packets of information and wherein the three basic packets of information are a floor packet, a message packet and a travel packet; and
    wherein the at least one block of M-bits of information comprises a start bit, type nibble, decoding key bit, encrypted data, decoding key bit, checksum, and a stop bit.

4. A communication system according to claim 1 wherein N and M are zero or a positive integer.

5. A communication system according to claim 1 wherein the floor packet includes a floor header, a floor number, three floor characters describing a floor and related bits of information.

6. A communication system according to claim 1 wherein the message packet includes a message header, a message number, three message characters, and related message bits of information.

7. A communication system according to claim 1 wherein the travel packet represent information for events of door strobes, chimes, up arrows or down arrows.

8. A communication system according to claim 1 wherein each block of the at least one block of N-bits of information is 28 bits of unencrypted information.

9. A communication system according to claim 1 wherein each block of the at least one block of M-bits of information is 40 bits of encoded information.

10. A communication system according to claim 1 wherein each of the three scattered packets of information include bits of floor information, bits of message information and bits of travel information.

11. A communication system according to claim 1 wherein the three blocks of information comprise one floor block of N-bits of floor information, a message block of N-bits of message information and a travel block of N-bits of travel information.

12. A communication system according to claim 1 wherein the at least one block of encrypted M-bits of information is three separate blocks of encrypted information.

13. A communication system according to claim 12 wherein each of the three blocks including encrypted floor information, encrypted message information and encrypted travel information.

14. A secure communication system for an elevator information or control system comprising:
- a primary controller for controlling operations of a plurality of elevators, information displays and other output devices;
- a plurality of subordinate controllers for controlling inputs to and outputs from an elevator;
- a floor block of unencrypted N-bits of floor information;
- a message block of unencrypted N-bits of message information;
- a travel block of unencrypted N-bits of travel information;
- an encryption device for encoding the N-bits of information into encrypted M-bits of information;
- a data encryption mask defining an encryption routine for placing the N-bits of information into the M-bits of information;
- three separate blocks of encrypted M-bits of information, each block of encrypted M-bits of information including scrambled, encrypted bits of floor, message and travel information;
- a transmitter for transmitting encrypted data from the primary controller to the subordinate controllers;
- a decryption algorithm in the subordinate controllers for decoding the encrypted information into unencrypted information;
- wherein the at least one block of N-bits of information is three basic packets of information and wherein the three basic packets of information are a floor packet, a message packet and a travel packet; and
- wherein the at least one block of M-bits of information comprises a start bit, type nibble, decoding key bit, encrypted data, decoding key bit, checksum, and a stop bit.

15. A process for transmitting data for an elevator information control system with a secure communication system comprising the steps of:
- placing at least one block of data assembled into unencrypted N-bits of information in at least one data packet;
- wherein the at least one block of N-bits of information is three basic packets of information and wherein the three basic packets of information are a floor packet, a message packet and a travel packet
- selecting a data encryption mask directing an encryption routine for placing the N-bits of information into M-bits of information;
- using an encryption algorithm for encoding the data into at least one block of encrypted M-bits of information wherein the at least one block of M-bits of information comprises a start bit, type nibble, decoding key bit, encrypted data, decoding key bit, checksum, and a stop bit; and
- transmitting the encrypted information.

16. A process according to claim 15 including the step of decoding the encrypted information into the at least one block of data assembled into unencrypted N-bits of information.

17. A process for transmitting data for an elevator control system with a secure communication system comprising the steps of:
- providing at least one block of N-bits of information is three basic packets of information and wherein the three basic packets of information are a floor packet, a message packet and a travel packet
- placing the floor information in unencoded floor data packet;
- placing the message information in unencoded message data packets;
- placing the travel information in unencoded travel data packets;
- selecting a data encryption mask defining an encryption routine for scrambling the information in the three separate data packets;
- using an encryption algorithm for encoding the information in the three separate data packets wherein the encrypted information comprises a start bit, type nibble, decoding key bit, encrypted data, decoding key bit, checksum, and a stop bit; and
- transmitting the encrypted information.

18. A process according to claim 17 including the steps of:
- receiving the transmitted, encoded packets;
- using a decryption algorithm to decode and unscramble the three encoded separate data packets into the original three unencoded separate data packets.

19. A process for transmitting data for an elevator information or control system with a secure communication system comprising the steps of:
- providing three basic packets of unencoded information, wherein the three basic packets of information are a floor packet, a message packet and a travel packet;
- retrieving the unencoded floor information;
- retrieving the unencoded message information;
- retrieving the unencoded travel information;
- scrambling the information into three separate data packets using a data encryption mask defining an encryption routine;
- using an encryption algorithm for encoding the information in the three separate data packets wherein the encrypted information comprises a start bit, type nibble, decoding key bit, encrypted data, decoding key bit, checksum, and a stop bit; and
- transmitting the encrypted separate data packets.

20. A process according to claim 19 wherein each of the three transmitted, encrypted separate data packets includes encrypted floor, message and travel information.

21. A process according to claim 19 including the steps of:
- retrieving the three transmitted, encoded separate packets;
- using a decryption algorithm to decode and unscramble the three encoded separate data packets into the original floor, message and travel information.

22. A secure communication system for an elevator information or control system comprising:
- a primary controller wherein the primary controller includes:
- at least one block of data assembled into unencrypted N-bits of information,
- wherein the at least one block of N-bits of information is three basic packets of information and wherein the three basic packets of information are a floor packet, a message packet and a travel packet;
- an encryption routine including an encryption algorithm for encoding the data into at least one block of encrypted M-bits of information;
- a data encryption mask directing the encryption routine for placing the N-bits of information into M-bits of information wherein the at least one block of M-bits of information comprises a start bit, type nibble, decoding key bit, encrypted data, decoding key bit, checksum, and a stop bit; and a transmitter for transmitting encrypted data from the primary controller; and wherein each block of the at least one block of N-bits of information is 28 bits of unencrypted information.

23. A secure communication system for an elevator information or control system comprising:
- a primary controller wherein the primary controller includes:
- at least one block of data assembled into unencrypted N-bits of information,
- wherein the at least one block of N-bits of information is three basic packets of information and wherein the three basic packets of information are a floor packet, a message packet and a travel packet;
- an encryption routine including an encryption algorithm for encoding the data into at least one block of encrypted M-bits of information;
- a data encryption mask directing the encryption routine for placing the N-bits of information into M-bits of information wherein the at least one block of M-bits of information comprises a start bit, type nibble, decoding key bit, encrypted data, decoding key bit, checksum, and a stop bit; and
- a transmitter for transmitting encrypted data from the primary controller; and
- wherein each block of the at least one block of M-bits of information is 40 bits of encoded information.

24. A communication system according to claim 23 wherein the at least one block of M-bits of information is three scattered packets of information.

25. A communication system according to claim 24 wherein each of the three scattered packets of information include bits of floor information, bits of message information and bits of travel information.

* * * * *